(12) United States Patent
Hermans et al.

(10) Patent No.: US 11,630,190 B2
(45) Date of Patent: Apr. 18, 2023

(54) ELECTRONIC DEVICE, METHOD AND COMPUTER PROGRAM

(71) Applicant: Sony Semiconductor Solutions Corporation, Kanagawa (JP)

(72) Inventors: Jeroen Hermans, Stuttgart (DE); Victor Belokonskiy, Zaventem (BE); Fabian Krome, Stuttgart (DE)

(73) Assignee: Sony Semiconductor Solutions Corporation, Kanagawa (JP)

( * ) Notice: Subject to any disclaimer, the term of this patent is extended or adjusted under 35 U.S.C. 154(b) by 137 days.

(21) Appl. No.: 16/832,566

(22) Filed: Mar. 27, 2020

(65) Prior Publication Data

US 2020/0309925 A1     Oct. 1, 2020

(30) Foreign Application Priority Data

Mar. 29, 2019  (EP) .................................... 19166062

(51) Int. Cl.
*G01S 7/497* (2006.01)
*G01S 17/89* (2020.01)

(52) U.S. Cl.
CPC .............. *G01S 7/497* (2013.01); *G01S 17/89* (2013.01)

(58) Field of Classification Search
None
See application file for complete search history.

(56) References Cited

U.S. PATENT DOCUMENTS

| 2012/0013887 | A1* | 1/2012 | Xu ......................... G01S 7/497 356/4.02 |
| 2016/0316193 | A1* | 10/2016 | Gruenwald ........... G01S 17/931 |
| 2021/0173088 | A1* | 6/2021 | Seliuchenko ........... G01S 17/89 |

OTHER PUBLICATIONS

Seiter, Johannes; Hofbaur, Michael; Davidovic, Milos; Zimmermann, Horst; Correction of a Phase Dependent Error in a Time-of-Flight-Range Sensor; 2013; SPIE vol. 8791; pp. 87910Y-1 to 87910Y-9 (Year: 2013).*

* cited by examiner

*Primary Examiner* — Mohamed Charioui
*Assistant Examiner* — Christine Y Liao
(74) *Attorney, Agent, or Firm* — Wolf, Greenfield & Sacks, P.C.

(57) ABSTRACT

An electronic device comprising circuitry configured to sample, in a calibration phase using a known time-of-flight $\tau_D$, a first set of differential mode measurements $\mu^{cal}$ ($n\Delta\tau_E$, $\tau_D$) according to a first sampling strategy $t_E^{cal}$, and to determine Fourier coefficients $M_k$ of the first set of differential mode measurements $\mu^{cal}(\tau_{E,n},\tau_D)$ based on the known time-of-flight ($\tau_D$) used in the calibration phase, and to determine a cyclic error ($f_{CE}(\theta_{1,\mu}(\tau_D);x)$) based on the Fourier coefficients ($M_k$).

22 Claims, 12 Drawing Sheets

ELECTRONIC DEVICE, METHOD AND COMPUTER PROGRAM

CROSS REFERENCE TO RELATED APPLICATIONS

The present application claims priority to European Patent Application 19166062.0 filed by the European Patent Office on Mar. 29, 2019, the entire contents of which being incorporated herein by reference.

TECHNICAL FIELD

The present disclosure generally pertains to the field of imaging devices and methods for imaging devices, in particular to time-of-flight imaging.

TECHNICAL BACKGROUND

A time-of-flight camera is a range imaging camera system that determines the distance of objects measuring the time-of-flight (ToF) of a light signal between the camera and the object for each point of the image. A time-of-flight camera thus receives a depth map of a scene. Generally, a time-of-flight camera has an illumination unit that illuminates a region of interest with modulated light, and a pixel array that collects light reflected from the same region of interest. As individual pixels collect light from certain parts of the scene, a time-of-flight camera may include a lens for imaging while maintaining a reasonable light collection area.

A typical ToF camera pixel develops a charge that represents a correlation between the illuminated light and the backscattered light. To enable the correlation between the illuminated light and the backscattered light, each pixel is controlled by a common demodulation input coming from a mixing driver. The demodulation input to the pixels is synchronous with an illumination block modulation.

Frequency aliasing is a well-known effect that appears when a signal is sampled at less than the double of the highest frequency contained in the signal (Nyquist-Shannon theorem). For example, for (indirect) ToF cameras, the frequency aliasing may result in a cyclic error of the depth or distance measurements, such that, in some embodiments, a calibration of the ToF camera may be needed.

Cyclic error calibration data may be acquired by capturing data from known objects positioned on known distances. For example, data captured from a planar surface may be positioned at a set of known positions in front of the ToF camera. Exploiting the known object shape and position, the known radial depth may be known in each pixel for each object position. Performing ToF capture and depth sensing for each object's position, a phase shift estimate may be obtained for each pixel (estimate of delay between transmitted and received light). These data are used to construct a model of measured phase versus true distance, which may be used at runtime to correct phases measured into distance estimates (removing cyclic errors). Besides space requirements, aforementioned method of construction a measured phase versus true distance relation directly depends on the method used to estimate the phase of the correlation waveform's first harmonics. Different calibration curves need to be generated for modes using different number of components or different correlation waveform sampling schemes.

Although there exist cyclic error calibration techniques for time-of-flight cameras, it is generally desirable to provide better cyclic error calibration techniques.

SUMMARY

According to a first aspect, the disclosure provides an electronic device comprising circuitry configured to sample, in a calibration phase using a known time-of-flight, a first set of differential mode measurements according to a first sampling strategy, to determine Fourier coefficients of the first set of differential mode measurements based on the known time-of-flight used in the calibration phase, and to determine a cyclic error based on the Fourier coefficients.

According to a second aspect, the disclosure provides an electronic device comprising circuitry configured to and to determine, at runtime, a cyclic error based on Fourier coefficients, aliasing weights, and a known time-of-flight.

According to a third aspect, the disclosure provides a method comprising, sampling, in a calibration phase using a known time-of-flight, a first set of differential mode measurements according to a first sampling strategy, determining Fourier coefficients of the first set of differential mode measurements based on the known time-of-flight used in the calibration phase, and determining a cyclic error based on the Fourier coefficients.

According to a fourth aspect, the disclosure provides a method comprising determining, at runtime, a cyclic error based on Fourier coefficients, aliasing weights, and a known time-of-flight.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
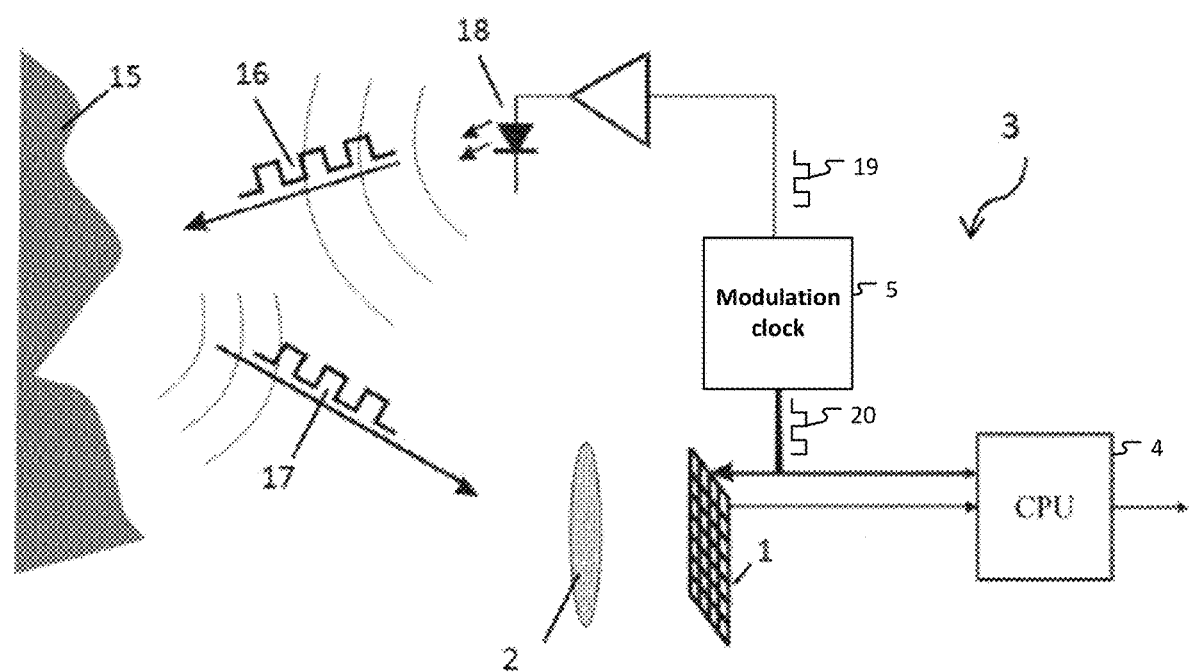
FIG. 1 illustrates schematically the basic operational principle of a time-of-flight (ToF) camera.

Before a detailed description of the embodiments under reference of FIG. 1, general explanations are made.

A first aspect of the present disclosure is directed to an electronic device comprising circuitry configured to sample, in a calibration phase using a known time-of-flight, a first set of differential mode measurements according to a first sampling strategy, and to determine Fourier coefficients of the first set of differential mode measurements based on the known time-of-flight used in the calibration phase. The electronic device may for example be a time of flight camera. For example, an indirect time of flight camera (iToF) measures a phase delay which results from a correlation of the modulation signal with reflected light. Time-of-flight (ToF) is known to include a variety of methods that measure the time that light needs for traveling a distance in a medium, such that the distance can be determined, e.g. by determining a phase shift.

The circuitry may include any electric elements, semiconductor elements, switches, amplifiers, transistors, processing elements, and the like. The circuitry may for example comprise an image sensor, in particular an image sensor of a time of flight camera. For example two taps or four taps of a ToF camera pixel are nodes where photocharges are collected depending on demodulation signals. In this way a ToF camera pixel may realize the sampling of differential mode measurements.

The differential mode measurements that are obtained by sampling can also be called "components" or "samples". The differential mode measurements (components) may for example be obtained by phase shifting a modulation signal and correlating each shifted modulation signal with a pixel irradiance signal.

The circuitry may further comprise processing circuitry such a CPU for performing computations such as Fourier transformation or the like. In particular, determining a cyclic error based on the first set of differential mode measurements and based on the second set of differential mode measurements may be realized by computations performed by such a CPU.

A cyclic error may be caused by frequency aliasing. Frequency aliasing is a well-known effect that appears when a signal is sampled at less than the double of the highest frequency contained in the signal (Nyquist-Shannon theorem). For example, for (indirect) ToF cameras, frequency aliasing may result in a cyclic error of the differential mode measurements (e.g. depth or distance measurements), such that, in some embodiments, a calibration of the ToF camera may be needed.

In some embodiments, according to the first aspect, the circuitry is configured to determine the Fourier coefficients according to $$M_k \approx e^{j2\pi k f_M \tau_D} \sum_{n=0}^{N_D^{cal}-1} \mu^{cal}(n\Delta\tau_E, \tau_D) e^{-j2\pi \frac{kn}{N_D^{cal}}}$$

with $N_D^{cal}$ is the number of samples used according to the first sampling strategy, $\mu^{cal}(n\Delta\tau_E,\tau_D)$ are the differential mode measurements of the first set of differential mode measurements, k indicates the Harmonics, $f_M$ is a modulation frequency, and $\tau_D$ is the known time-of-flight used in the calibration phase.

For example, the circuitry may be configured to generate a spectral representation of the correlation waveform by Fast-Fourier-Transforming the respective differential mode measurements. The harmonics of the respective differential mode are for example represented by the result of the Fast-Fourier-Transformation, e.g. by an EDFT.

In some embodiments, according to the first aspect, wherein the circuitry is further configured to store the Fourier coefficients in a look-up table.

In some embodiments, according to the first aspect, the first sampling strategy, a set of equidistant samples is measured.

In some embodiments, according to the first aspect, the circuitry is configured to determine aliasing weights based on a second sampling strategy.

In embodiments, according to the first aspect, the number of components sampled according to the first sampling strategy is larger than the number of components sampled according to the second sampling strategy. The differential mode measurements of the first set (larger number of components) may for example be distributed equidistantly in phase space. The modulation signal may be shifted with equidistant phase steps in the phase space from 00 to 360° and correlated with the reflected light. Alternatively, the modulation signal may be shifted by unequal phase steps. The second set of differential mode measurements (smaller number of components) may correspond to a quad-based sampling scheme as used at runtime.

In some embodiments, according to the first aspect, the circuitry is configured to determine, for each Fourier coefficient, an aliasing weight according to $$A_k = \sum_{n=0}^{S-1} e^{j2\pi\left(kf_M\tau_{E,n}-\frac{n}{s}\right)}$$

where $f_M$ is a modulation frequency, S is the number of samples used in the second sampling strategy, and $\tau_{E,n}$ are the transmit delays of the second sampling strategy.

In some embodiments, according to the first aspect, the circuitry is configured to determine a cyclic error based on the Fourier coefficient, the aliasing weights and the known time-of-flight. The circuitry may be configured to correct a cyclic error in any type of differential mode measurements. Different modes of correlation waveforms may be used for some or each component. Cyclic error correction may be performed per correlation waveform used instead of per mode used. Hence, different modes using the same correlation waveform (e.g. a 4-component mode and a 5-component mode with the same modulation frequency) may rely on the same calibration data, instead of requiring separate calibration acquisitions. The electronic device thus allows for a calibration by calibrating the cyclic error independent of the correlation waveform sampling scheme used to capture data and estimate phase (components). For example, instead of directly measuring a measured phase-vs-true distance curve (wall sweep), a sufficient set of correlation waveform samples may be measured, and more specifically their expected value may be measured to remove noise. This can be interpreted as the expected value of component data of a single ToF frame with several components. The circuitry may be configured use a rectangular signal as an in-pixel reference signal. The in-pixel reference signal may correspond to a modulation signal used for modulating emitted light. Instead of a rectangular shaped modulation signal, other modulation signals may be used, for example a Waikato Burst modulation scheme. Also different duty cycles of the modulation signal and the emitting signal may be used.

In some embodiments, according to the first aspect, the circuitry is configured to determine the cyclic error according to $$f_{CE}(\theta_{1,\mu}(\tau_D);x) = \angle(\Sigma_k A_k M_k e^{j2\pi k f_m \tau_D}) - \theta_{1,\mu}(\tau_D)$$

wherein the phase angle $\theta_{1,\mu}(\tau_D)$ is a phase angle related to the first Fourier coefficient of the Fourier coefficients.

In some embodiments, according to the first aspect, the phase angle $\theta_{1,\mu}(\tau_D)$ is determined according to $$\theta_{1,\mu}(\tau_D) = 2\pi f_M \tau_D + \angle M_1$$

where $M_1$ is the first Fourier coefficient, $f_M$ is the modulation frequency and $\tau_D$ is the single and known time-of-flight.

In some embodiments, according to the first aspect, the circuitry is further configured to store the cyclic error in a look-up table.

In some embodiments, according to the first aspect, the circuitry is configured to use the cyclic error at runtime to correct a second set of differential mode measurements sampled according to the second sampling strategy. The cyclic error may be determined in a calibration process. The calibration data obtained may than be used at runtime to correct measured phases (removing cyclic errors). The runtime may be the time during which the electronic device is running (executing) in a second sampling strategy to obtain a distance of an object where the time-of-flight is unknown.

In some embodiments, according to the first aspect, the circuitry is further configured to retrieve at runtime the cyclic error from a look-up table.

In some embodiments, according to the first aspect, the circuitry is further configured to retrieve at runtime the Fourier coefficients from a look-up table and to determine the cyclic error based on the Fourier coefficients.

In some embodiments, according to the first aspect, the second sampling strategy is a quad-based sampling strategy.

In some embodiments, according to the first aspect, the electronic device is applied in a time-of-flight camera.

A second aspect of the present disclosure is directed to an electronic device comprising circuitry configured to and to determine, at runtime, a cyclic error based on Fourier coefficients, aliasing weights, and a known time-of-flight.

In some embodiments, according to the second aspect, the known time-of-flight has been used in a calibration phase to obtain the Fourier coefficients according to a first sampling strategy.

In some embodiments, according to the second aspect, the circuitry is configured to retrieve, at runtime, the Fourier coefficients from a look-up table.

In some embodiments, according to the second aspect, the circuitry is configured to determine the cyclic error according to $$f_{CE}(\theta_{1,\mu}(\tau_D);x) = \angle(\Sigma_k A_k M_k e^{j2\pi k f_m \tau_D}) - \theta_{1,\mu}(\tau_D)$$

wherein $\mu_{1,\mu}(\tau_D)$ is a phase angle related to the first Fourier coefficient of the Fourier coefficients.

In some embodiments, according to the second aspect, the second sampling strategy is a quad-based sampling strategy.

In some embodiments, according to the second aspect, the electronic device is applied in a time-of-flight camera.

A third aspect of the present disclosure is directed to a method comprising sampling, in a calibration phase using a known time-of-flight, a first set of differential mode measurements according to a first sampling strategy, and determining Fourier coefficients of the first set of differential mode measurements based on the known time-of-flight used in the calibration phase.

A fourth aspect of the present disclosure is directed to a method comprising determining, at runtime, a cyclic error based on Fourier coefficients, aliasing weights, and a known time-of-flight.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

FIG. 1 illustrates schematically the basic operational principle of a time-of-flight (ToF) camera. The ToF camera 3 captures 3D images of a scene 15 by analyzing the time-of-flight of light from a dedicated illumination unit 18 to an object. The ToF camera 3 includes a camera, for instance an imaging sensor 1 and a processor 4. The dedicated illumination unit 18 obtains a modulation signal 19, for example a square wave signal with a predetermined frequency, which is generated by a timing generator 5. A scene 15 is actively illuminated with an emitted light 16 at a predetermined wavelength using the dedicated illumination unit 18. The emitted light 16 is reflected back from objects within the scene 15. A lens 2 collects the reflected light 17 and forms an image of the objects onto the imaging sensor 1 of the camera. Depending on the distance of objects from the camera, a delay is experienced between the emission of the emitted light 16, e.g. the so-called light pulses, and the reception at the camera of those reflected light pulses 17. Distances between reflecting objects and the camera may be determined as function of the time delay observed and the speed of light constant value.

Indirect time-of-flight (iToF) cameras determine a delay between emitted light 16 and reflected light 17 for obtaining depth measurements by sampling in each iToF camera pixel of the imaging sensor 1 a correlation waveform, e.g. between a demodulation signal 19 generated by the timing generator 5 and the reflected light 17 that is stored in the iToF camera pixel of the imaging sensor 1.

Consider an iToF camera pixel imaging an object at a distance D. A (differential) iToF pixel measurement $v(\tau_E, \tau_D)$ is a variable whose expected value is given by $$\mu(\tau_E,\tau_D) = E(\nu(\tau_E,\tau_D)) = \int_0^{T_I} m(t)\phi_R(t,\tau_E,\tau_D)dt \qquad \text{(Eq. 1)}$$

where, $t$ is the time variable, $T_I$ is the exposure time (integration time), $m(t)$ is the in-pixel reference signal which corresponds to the modulation signal (19 in FIG. 1) or a phase shifted version of the modulation signal, and $\phi_R(t,\tau_E,\tau_D)$ is the pixel irradiance signal which represents the reflected light (17 in FIG. 1) captured by the pixel. $\tau_E$ represents a time variable indicative of the time delay between the modulation signal and the emitted light (16 in FIG. 1), and $\tau_D$ is a time variable representing the time that it is required for the light to travel from the ToF camera (3 in FIG. 1) to the object (15 in FIG. 1) and back. Neglecting the parallax effect, the time variable $\tau_D$ is given by:

$$\tau_D = \frac{2D}{c} \quad \text{(Eq. 2)}$$

where D is the distance between the ToF camera and the object, and c is the speed of light.

The reflected light signal $\phi_R(t,\tau_E,\tau_D)$ is a scaled and delayed version of the emitted light $\phi_E(t-\tau_E)$. The pixel irradiance signal $\phi_R(t,\tau_E,\tau_D)$ is given by:

$$\phi_R(t,\tau_E,\tau_D) = \phi(\tau_D) \times \phi_E(t-\tau_E-\tau_D) \quad \text{(Eq. 3)}$$

where $\phi(\tau_D)$ is a real value scaling factor that depends on the distance D between the ToF camera and the object, and $\phi_E(t-\tau_E-\tau_D)$ is the emitted light $\phi_E(t-\tau_E)$ additionally delayed with the time variable $\tau_D$.

In the context of iToF, both m(t) and $\phi_E(t)$ are periodical signals with period $T_M = f_M^{-1}$ ($f_M$ being the fundamental frequency or modulation frequency generated by the modulation clock (5 in FIG. 1).

As $T_I \gg T_M$, the expected differential signal $\mu(\tau_E,\tau_D)$ is also a periodical function with respect to the electronic delay $\tau_E$ between in-pixel reference signal m(t) and optical emission $\phi_E(t-\tau_E)$ with the same fundamental frequency $f_M$.

Writing $(\tau_E,\tau_D)$ in terms of its Fourier Coefficients $M_k$ yields $$\mu(\tau_E,\tau_D) = \phi(\tau_D) \Sigma_{k=-\infty}^{\infty} (M_k e^{j2\pi k f_M \tau_D}) e^{j2\pi k f_M \tau_E} \quad \text{(Eq. 4)}$$

Note that due to the distance-dependent scaling of the light (factor $(\tau_D)$), the expected differential signal $\mu(\tau_E,\tau_D)$ is not periodical with respect to the time-of-flight $\tau_D$.

From the above it is clear that the time-of-flight, and hence depth, can be estimated from the first harmonic $H_1(\tau_D)$ of $\mu(\tau_E,\tau_D)$:

$$H_{1,\mu}(\tau_D) = \int \mu(\tau_E,\tau_D) e^{-j2\pi f_m \tau_E} d\tau_E \propto \phi(\tau_D) M^1 e^{j2\pi f_M \tau_D} \quad \text{(Eq. 5)}$$

From the first harmonic $H_{1,\mu}(\tau_D)$ the phase angle $\theta_{1,\mu}(\tau_D)$ is obtained as $$\theta_{1,\mu}(\tau_D) = \angle H_{1,\mu}(\tau_D) = 2\pi f_M \tau_D + \psi_{M_1} \quad \text{(Eq. 6)}$$

with $$\psi_{M_1} = \angle M_1 \quad \text{(Eq. 7)}$$

Here, $\angle$ denotes the phase of a complex number $z = re^{i\phi}$ $$\angle z = \angle (re^{i\phi}) = \phi \quad \text{(Eq. 8)}$$

In practice, it is not feasible to evaluate $H_{1,\mu}(\tau_D)$ due to the presence of noise and due to the number of transmit delays.

Concerning the presence of noise, $H_{1,\mu}(\tau_D)$ is formulated in terms of the expected value $\mu(\tau_E,\tau_D)$ of differential mode measurements $v(\tau_E,\tau_D)$. Estimating this expected value from measurements may be performed by multiple repeated acquisitions (of static scene) to average out noise.

Concerning the number of transmit delays, $H_{1,\mu}(\tau_D)$ is given as an integral over all possible transmit delays $\tau_E$. Approximating this integral may require a high number of transmit delays.

Due to these reasons iToF systems measure an approximation of this first harmonic $H_{1,\mu}(\tau_D)$. This approximation typically uses a limited number of S differential mode measurements $v(\tau_{E,n},\tau_D)$ (n=0, ..., S-1) corresponding to S electronic transmit delays $\tau_{E,n}$. A vectorized representation of this set of transmit delays is:

$$t_E = [\tau_E \ldots \tau_{E,S-1}]^T \quad \text{(Eq. 9)}$$

The approximation of the first harmonic $H_{1,\mu}(\tau_D)$ is typically obtained by an S-point EDFT (Extended Discrete Fourier Transform), according to $$H_{1,v}(\tau_D; t_E) = \sum_{n=0}^{S-1} v(\tau_{E,n}, \tau_D) e^{-j2\pi \frac{hn}{s}} \quad \text{(Eq. 10)}$$

with h being the S-point EDFT bin considered. In standard iToF, h=1. However, depending on the transmit delays selected, different values of h could be more appropriate.

For simplicity and without loss of generality, we will assume h=1 in the remainder of this disclosure:

$$H_{1,v}(\tau_D; t_E) = \sum_{n=0}^{S-1} v(\tau_{E,n}, \tau_D) e^{-j2\pi \frac{n}{s}} \quad \text{(Eq. 11)}$$

This first harmonic estimate $H_{1,v}(\tau_D; t_E)$ is also referred to as IQ measurement (with I and Q the real resp. imaginary part of the first harmonic estimate). In order to stay close to iToF nomenclature, in the following $H_{1,v}(\tau_D; t_E)$ is denoted as "IQ measurement". However, it is important to remember that an IQ measurement is an estimate of the first harmonic $H_{1,\mu}(\tau_D)$ of the expected differential measurement (as function of transmit delay).

Due to the statistical nature of the differential mode measurements $v(\tau_{E,n},\tau_D)$, the IQ measurement $H_{1,v}(\tau_D; t_E)$ is a random variable with the following expected value $$E(H_{1,v}(\tau_D; t_E)) \equiv H_{1,\mu}(\tau_D; t_E) = \sum_{n=0}^{S-1} \mu(\tau_{E,n}, \tau_D) e^{-j2\pi \frac{n}{s}} \quad \text{(Eq. 12)}$$

This expected value is here referred to as expected IQ measurement. In general, the IQ measurement $H_{1,v}(\tau_D; t_E)$ is a biased estimator of the intended first harmonic $H_{1,\mu}(\tau_D)$, meaning that the expected IQ measurement $H_{1,\mu}(\tau_D; t_E)$ is only an approximation of the intended harmonic $H_{1,\mu}(\tau_D)$ and thus not equal to the intended harmonic:

$$H_{1,\mu}(\tau_D; t_E) \neq H_{1,\mu}(\tau_D) \quad \text{(Eq. 13)}$$

This is because $H_{1,\mu}(\tau_D; t_E)$ relies on a small set of S transmit delays and a measurement of the exact harmonic $H_{1,\mu}(\tau_D)$ requires an infinite amount of transmit delays (integral).

Cyclic Error Function

As an extension of this, the expected IQ measurement's phase $\theta_{1,\mu}(\tau_D; t_E) \angle H_{1,\mu}(\tau_D; t_E)$ also differs from the intended harmonic's phase $\theta_{1,\mu}(\tau_D) \angle H_{1,\mu}(\tau_D)$:

$$\theta_{1,\mu}(\tau_D; t_E) \neq \theta_{1,\mu}(\tau_D) \quad \text{(Eq. 14)}$$

In general, the phase $\theta_{1,\mu}(\tau_D; t_E)$ is related to $\theta_{1,\mu}(\tau_D)$ through a cyclic error function $f_{CE}(\theta_{1,\mu}(\tau_D); x)$, according to:

$$\theta_{1,\mu}(\tau_D; t_E) = \theta_{1,\mu}(\tau_D) + f_{CE}(\theta_{1,\mu}(\tau_D); x) \quad \text{(Eq. 15)}$$

This cyclic error function depends on the properties of the expected differential measurement signal $\mu(\tau_E,\tau_D)$ and of the set $t_E$ of transmit delays applied.

Cyclic error calibration intends to determine/estimate this cyclic error function $f_{CE}(\theta_{1,\mu}(\tau_D); x)$.

CWF-Based Cyclic Error Calibration

Opposed to IQ-based cyclic error calibration operating on phases $\theta_{1,\mu}(\tau_D; t_E)$ of expected IQ measurements, CWF-based cyclic error calibration (CWF=Continuous Wave ToF) directly operates on the expected differential measurements $\mu^{cal}(\tau_E,\tau_D)$. In other words, it estimates the expected differential measurement signal itself $\mu^{cal}(\tau_E,\tau_D)$ and reconstructs the cyclic error function from aliasing theory. The differential measurement signal $(\tau_E, \tau_D)$ that is obtained in a calibration phase using a single and known time-of-flight $\tau_D$ will be quantified in terms of its harmonics $M_k$ (or a scalar multiple of them). Once these harmonics are known, they can be used to reconstruct the cyclic error function for any set $t_E$ of transmit delays considered. This results in that re-calibration is not needed when changing the set of transmit delays (as long as the expected differential signal remains unchanged).

To estimate the harmonics $M_k$ of the expected differential signal $\mu(\tau_E, \tau_D)$ different approaches can be followed. The most straightforward way is to measure a set $D=\{\mu(n\Delta\tau_E, \tau_D)\}$ of $N_D^{cal}$ equidistant samples $\mu(n\Delta\tau_E, \tau_D)(n=0, \ldots, N_D^{cal}-1)$ of the expected differential signal $\mu(\tau_E, \tau_D)$. These samples are obtained by applying different transmit delays $\tau_{E,n}^{cal} = n\Delta\tau_E$ within one modulation period $(N\Delta\tau_E = T_M)$. According to Eq. 9 a vectorized representation of this set of transmit delays is $t_E^{cal} = [0 \ldots (N_D^{cal}-1)\Delta\tau_E]^T$.

According to an embodiment, the $N_D^{cal}$ components are distributed equidistantly in the phase space $[0, 2\pi[$, corresponding to the set of $$\tau_{E,n}^{cal} = \frac{2\pi n}{N_D^{cal} f_M}, n = 0, \ldots, N_D^{cal} - 1 \quad \text{(Eq. 16)}$$

where $f_M$ is the frequency of the modulation signal as generated by the modulation clock (5 in FIG. 1).

Figure 2:
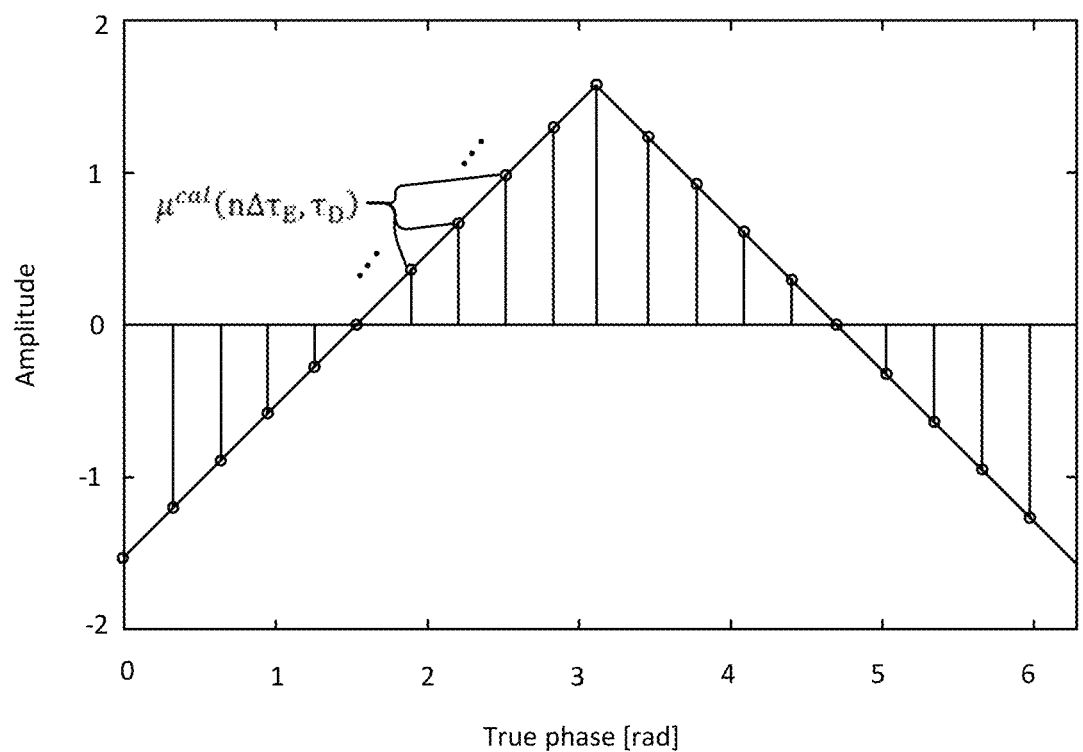
FIG. 2 illustrates, as an embodiment, a set of differential mode measurements, wherein the set of differential mode measurements comprises $S^{cal}$ components that are distributed equidistantly in phase space.

FIG. 2 illustrates, as an embodiment, a set of differential mode measurements, wherein the set of differential mode measurements comprises $N_D^{cal}$ 20 samples (components) that are distributed equidistantly in phase space. In FIG. 2, the $\mu^{cal}(n\Delta\tau_E, \tau_D)$ equidistant samples are indicated by small circles. The abscissa of FIG. 2 represents the true phase of the $N_D^{cal}$ components in radiant (rad) in the interval from 0 to $2\pi$ (0° to 360°). The ordinate of FIG. 2 represents the amplitude of the respective components, i.e. the amplitude (pixel measurement). These measured amplitudes correspond to the expected differential mode measurements $\mu^{cal}(n\Delta\tau_E, \tau_D)$ as described above. Estimating the expected value $\mu^{cal}(n\Delta\tau_E, \tau_D)$ from measurements may be performed by multiple repeated acquisitions (of static scene) to average out noise.

Further, it is assumed in FIG. 2 that the modulation signal m(t) (not shown in FIG. 2) is a square wave signal. Therefore, the reflected signal is also a square wave signal and the resulting correlation waveform is a triangular wave signal. The maximum of the correlation waveform (triangular wave signal) represents the phase shift between the modulation signal m(t) as generated by the modulation clock (5 in FIG. 1) and the pixel irradiance signal $\phi_R(t, \tau_E, \tau_D)$ as received in an iToF camera pixel.

Difference in amplitude can be corrected by means of confidence evaluation.

After obtaining the (expected value) of $N_D^{cal}$ correlation waveform samples in the calibration phase using a single and known time-of-flight $\tau_D$, a spectral representation of the correlation waveform is generated based on the $N_D^{cal}$-point EDFT. In the context of a ToF camera, both modulation signal m(t) and emitted light $\phi_E(t-\tau_E)$ are periodical signals with a fundamental frequency $f_M$. As the integration time T is greater than the integration time T is greater than the period $$\frac{1}{f_M}$$

of the modulation signal, the expected correlation function is also a periodical function.

With $N_D^{cal}$ sufficiently large (w.r.t. the harmonic content of $\mu(\tau_E, \tau_D)$), the $N_D^{cal}$ point EDFT (Extended Discrete Fourier Transform) of the samples yields an estimate of $M_k$ according to $$M_k \approx e^{j2\pi k f_M \tau_D} \sum_{n=0}^{N_D^{cal}-1} \mu^{cal}(n\Delta\tau_E, \tau_D) e^{-j2\pi \frac{kn}{N_D^{cal}}} \quad \text{(Eq. 17)}$$

for $|k| \leq 0.5 N_D$. For all higher harmonics $|k| \geq 0.5 N_D^{cal}$, $M_k$ is assumed/estimated to be zero.

The Fourier Coefficients $M_k$ as obtained during calibration can be stored in a look-up table to be later used at runtime for cyclic error correction.

Hence, as expected, the sampling strategy applied constrains the number of resolvable harmonics as well as their accuracy (due to aliasing of higher harmonics). In practice the true harmonics $M_k$ of the expected differential signal have decreasing amplitude with increasing harmonic order $|k|$. This limits the aliasing effects on the harmonics estimate, provided sufficiently high sampling rate. Note that previous approximation is determined up to a real-valued scaling factor, which is not relevant in the context of cyclic error correction. It must also be noted that in this particular example, $M_k$ estimates are obtained using a single and known time-of-flight $\tau_D$.

Figure 3:
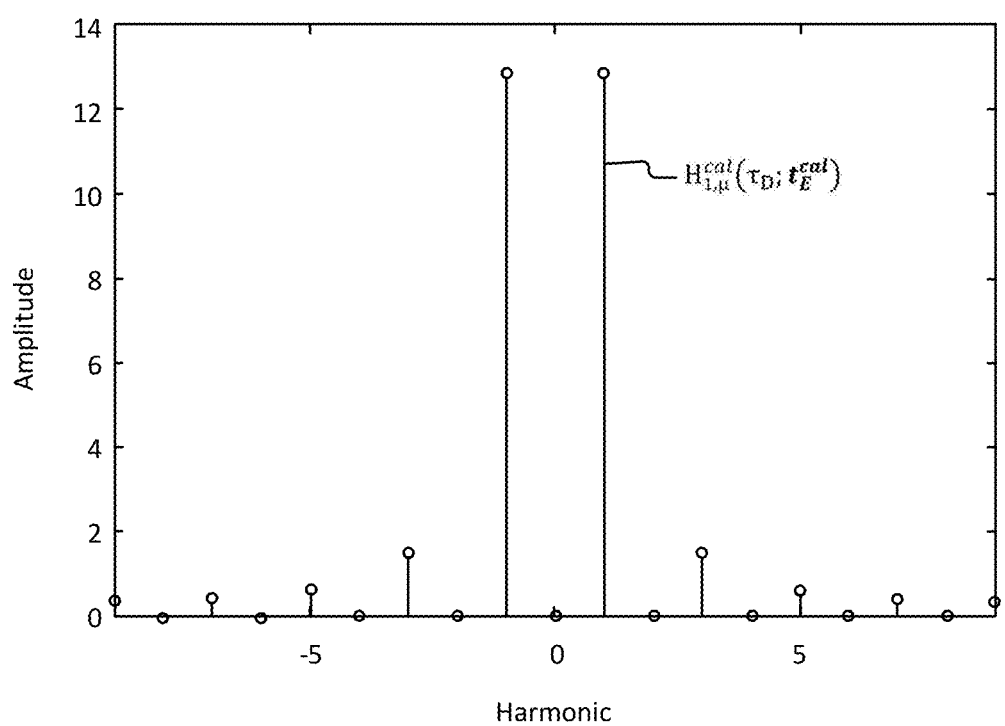
FIG. 3 illustrates the absolute value of the Discrete-Fourier-Transform (DFT) of the correlation waveform of FIG. 2.

FIG. 3 illustrates the absolute value of the Discrete-Fourier-Transform (DFT) of the correlation waveform of FIG. 2. The abscissa of FIG. 3 represents the harmonics $k=(-9, \ldots, -1, 0, 1, \ldots, 9)$, and the ordinate represents the amplitude (absolute value) $|H_{k,\mu}^{cal}(\tau_D; t_E^{cal})|$ of the respective harmonics $H_{k,\mu}^{cal}(\tau_D; t_E^{cal})$. As the correlation waveform is periodical, its spectrum is discrete.

Assuming that the modulation signal m(t) is a square wave signal, the resulting (ideal) correlation waveform is a perfect triangular correlation function. For a perfect triangular wave signal the frequency spectrum is given as:

$$F(tri) = \frac{\sin(\pi x)^2}{(\pi x)^2} \quad \text{(Eq. 18)}$$

It follows from Eq. 18 that (apart from a potential DC contribution) any even harmonic of the correlation waveform is zero and the decline is quadratic. Accordingly, the amplitude of the harmonics −8, −6, −4, −2, 0, 2, 4, 6, and 8 in FIG. 3 is zero and the amplitude has a maximum at the first harmonics −1 and 1.

Assuming that the resulting correlation waveform is a perfect triangular correlation function, it also follows from Eq. 18 that the correlation waveform has high frequency components.

The Discrete-Fourier-Transform (DFT) can reconstruct a signal in the frequency domain if the Nyquist condition is fulfilled. The Nyquist condition states that a signal can be perfectly reconstructed, if the discrete sampling frequency is two times higher than the highest frequency contained in the signal. If a sampling frequency does not fulfill this condition aliasing occurs. Frequency aliasing is a well-known effect that appears when a signal is sampled at less than the double of the highest frequency contained in the signal (Nyquist-Shannon theorem). Here, for (indirect) ToF cameras, as the resulting correlation waveform may a perfect triangular correlation function, frequency aliasing may exist and the frequency aliasing may result in a cyclic error $f_{CE}(\theta_{1,\mu}(\tau_D);x)$ (see Eq. 15 above) of the depth or distance measurements.

As described in section cyclic error calibration and in Eq. 15 above, usage of a limited number of correlation waveform samples to estimate the phase $\theta_{1,\mu}^{cal}(\tau_D;t_E^{cal})$ of its first harmonic $H_{1,\mu}^{cal}(\tau_D;t_E^{cal})$ ("(expected) IQ measurement") introduces cyclic errors/wiggling errors $f_{CE}^{cal}(\theta_{1,\mu}(\tau_D);x)$ due to frequency aliasing of higher harmonics (of the correlation waveform) on top of this first harmonic estimate.

Due to the higher sampling in the calibration phase, it is possible to assume that the first harmonic of the DFT for the correlation function is accurate so that:

$$f_{CE}^{cal}(\theta_{1,\mu}(\tau_D);x) \approx 0 \quad \text{(Eq. 19)}$$

and $$\theta_{1,\mu}^{cal}(\tau_D;t_E^{cal}) \approx \theta_{1,\mu}(\tau_D) \quad \text{(Eq. 20)}$$

with $$\theta_{1,\mu}^{cal}(\tau_D;t_E^{cal}) = \angle H_{1,\mu}^{cal}(\tau_D;t_E^{cal})$$

The approximation $\theta_{1,\mu}^{cal}(\tau_D;t_E)$ as obtained during calibration can be stored in a look-up table to be later used at runtime for cyclic error correction.

Elaborating the expected IQ measurement $H_{1,\mu}^{cal}(\tau_D;t_E)$ in terms of the harmonics $M_k$ of the expected differential measurement $\mu^{cal}(\tau_E,\tau_D)$ as obtained in the calibration phase yields:

$$H_{1,\mu}^{cal}(\tau_D;t_E) = \Phi(\tau_D)\sum_k A_k M_k e^{j2\pi k f_m \tau_D} \text{ with} \quad \text{(Eq. 21)}$$

$$A_k = \sum_{n=0}^{S-1} e^{j2\pi(kf_M\tau_{E,n}-\frac{n}{s})} \quad \text{(Eq. 22)}$$

Hence, the expected IQ measurement $H_{1,\mu}^{cal}(\tau_D;t_E)$ is a linear combination of all harmonics $M_k$ with (aliasing) weights $A_k$ and after distance-dependent phase shifting $(2\pi k f_m \tau_D)$. The aliasing weights $A_k$ are exclusively determined by the sampling strategy applied. Hence, the cyclic error function is given by $$f_{CE}(\theta_{1,\mu}(\tau_D);x) = \angle(\Sigma_k A_k M_k e^{j2\pi k f_m \tau_D}) - \theta_{1,\mu}(\tau_D) \quad \text{(Eq. 23)}$$

where the $\theta_{1,\mu}(\tau_D)$ is known in the calibration phase using the single and known time-of-flight $\tau_D$ (cf. Eq. 6).

Determining the Cyclic Error in Quad-Based Sampling

During real-time measurements (at runtime), the number of components (samples) is typically chosen to be lower than the number of components used during the calibration phase, so that the aliasing effects are larger.

In the embodiment described here, a quad-based sampling approach is chosen as an example. A quad-based iToF system obtains an approximation $H_{1,\mu}^{quad}(\tau_D;t_E^{quad})$ ("expected IQ measurement") of the first harmonic $H_{1,\mu}(\tau_D)$ using a predefined number of S=4 of (expected) differential mode measurements $\mu^{quad}(\tau_{E,n}^{quad},\tau_D)$ (n=0, . . . , 3). A vectorized representation of this set of transmit delays is $t_E^{quad}=[\tau_{E,n}^{quad} \ldots \tau_{E,3}^{quad}]^T$, wherein the $\tau_{E,0} \ldots \tau_{E,3}$ are the delays that correspond to the phase shifts 0°, 90°, 180°, 270°.

Figure 4:
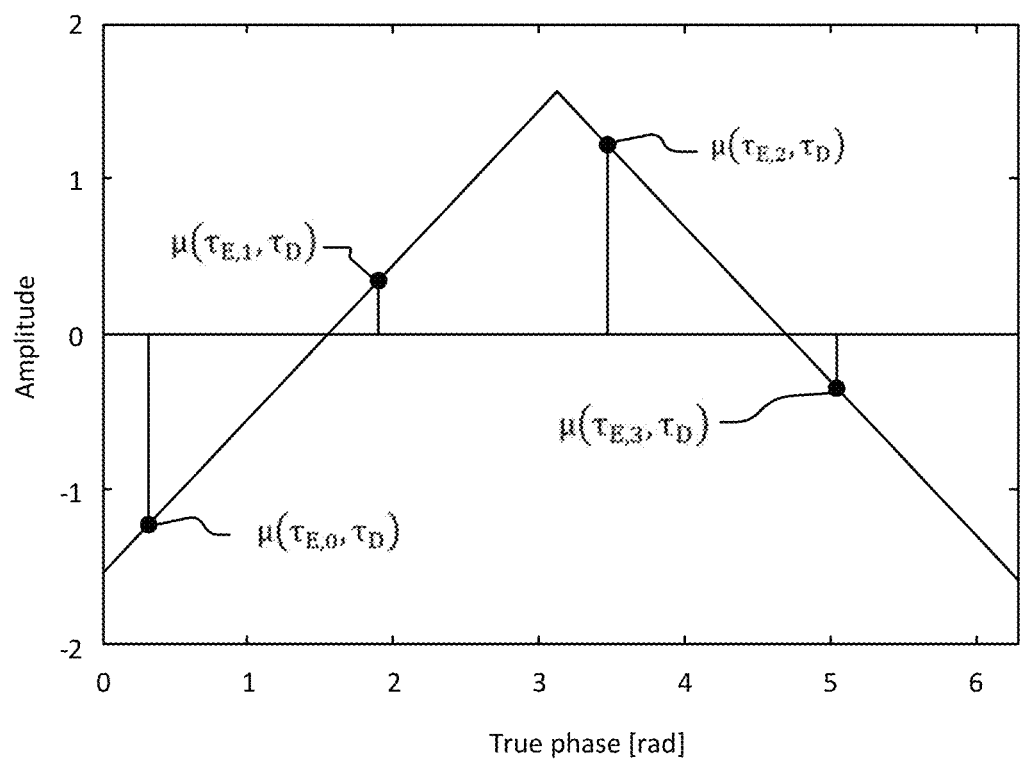
FIG. 4 illustrates a four component set of differential mode measurements.

FIG. 4 illustrates a four component set of differential mode measurements. As in FIG. 2, the four components are indicated by small circles, the abscissa represents the true phase in the interval from 0 to $2\pi$ (0° to 360°), and the ordinate represents the amplitude of the respective components, i.e. the pixel measurement. These measured amplitudes correspond to the expected differential mode measurements $\mu^{quad}(\tau_{E,n}^{quad},\tau_D)$ (n=0, . . . , 3). Estimating these expected values from measurements may be performed by multiple repeated acquisitions (of static scene) to average out noise.

After obtaining the (expected value) of four correlation waveform samples, a spectral representation of the correlation waveform is generated based on the 4-point EDFT.

Figure 5:
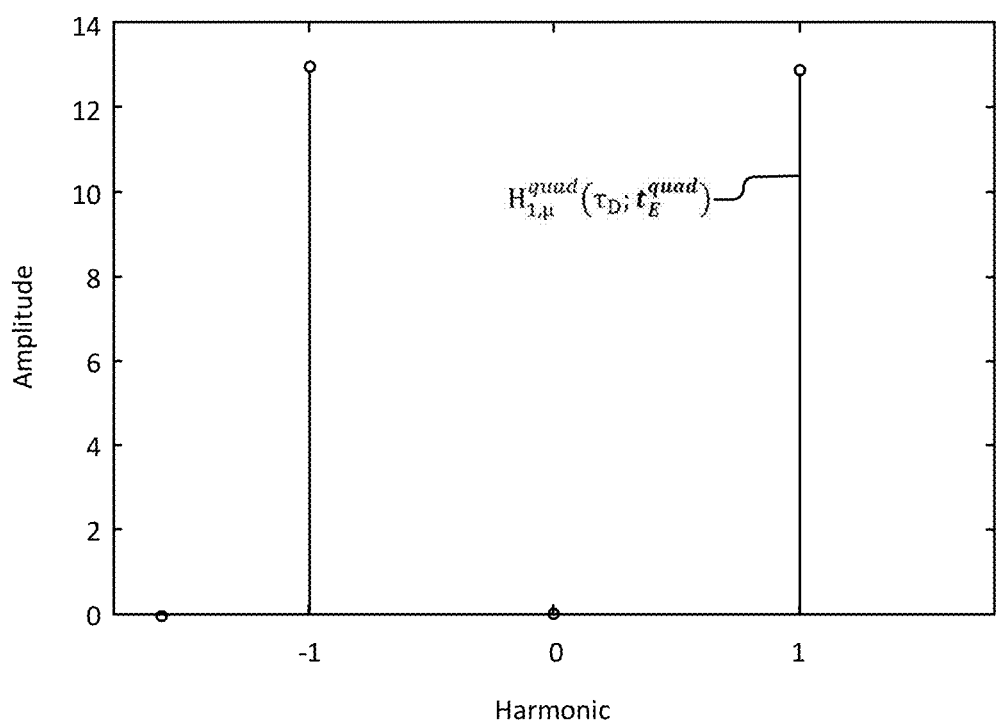
FIG. 5 illustrates the absolute value of the Discrete-Fourier-Transform (DFT) of the correlation waveform of FIG. 4.

FIG. 5 illustrates the absolute value of the Discrete-Fourier-Transform (DFT) of the correlation waveform of FIG. 4. The abscissa of FIG. 5 represents the harmonics k=(−1, . . . , 1), and the ordinate represents the amplitude (absolute value) $|H_{k,\mu}^{quad}(\tau_D;t_E^{quad})|$ of the respective harmonics $H_{k,\mu}^{quad}(\tau_D;t_E^{quad})$. As described in section cyclic error calibration and in Eq. 15 above, usage of a limited number of correlation waveform samples to estimate the phase $\theta_{1,\mu}^{quad}(\tau_D;t_E^{quad})$ of its first harmonic results in a cyclic error $f_{CE}^{quad}(\theta_{1,\mu}(\tau_D);x)$ (due to the aliasing effect described above in more detail). $H_{1,\mu}^{quad}(\tau_D;t_E)$ ("(expected) IQ measurement") in quad-based sampling introduces cyclic errors/wiggling errors $f_{CE}^{quad}(\theta_{1,\mu}(\tau_D);x)$ due to frequency aliasing of higher harmonics (of the correlation waveform) on top of this first harmonic estimate. Due to the lower sampling in the calibration phase, the cyclic error $f_{CE}^{quad}(\theta_{1,\mu}(\tau_D);x)$ is significant. From Eq. 15 the Cyclic error is the difference between the true phase $\theta_{1,\mu}(\tau_D)$ and the quad-based phase $\theta_{1,\mu}^{quad}(\tau_D;t_E)$ $$f_{CE}^{quad}(\theta_{1,\mu}(\tau_D);x) = \theta_{1,\mu}^{quad}(\tau_D;t_E^{quad}) - \theta_{1,\mu}(\tau_D) \text{ with} \quad \text{(Eq. 24)}$$

$$\theta_{1,\mu}^{quad}(\tau_D;t_E^{quad}) = \angle H_{1,\mu}^{quad}(\tau_D;t_E^{quad}) = \angle\left(\sum_k A_k^{quad} M_k e^{j2\pi k f_m \tau_D}\right) \text{ with} \quad \text{(Eq. 25)}$$

$$A_k^{quad} = \sum_{n=0}^{3} e^{j2\pi(kf_M\tau_{E,n}^{quad}-\frac{n}{s})}$$

The Fourier Coefficients $M_k$ as obtained from Eq. 17 during calibration can be obtained from a look-up table that has been generated during calibration using a single and known time-of-flight $\tau_D$.

Figure 6:
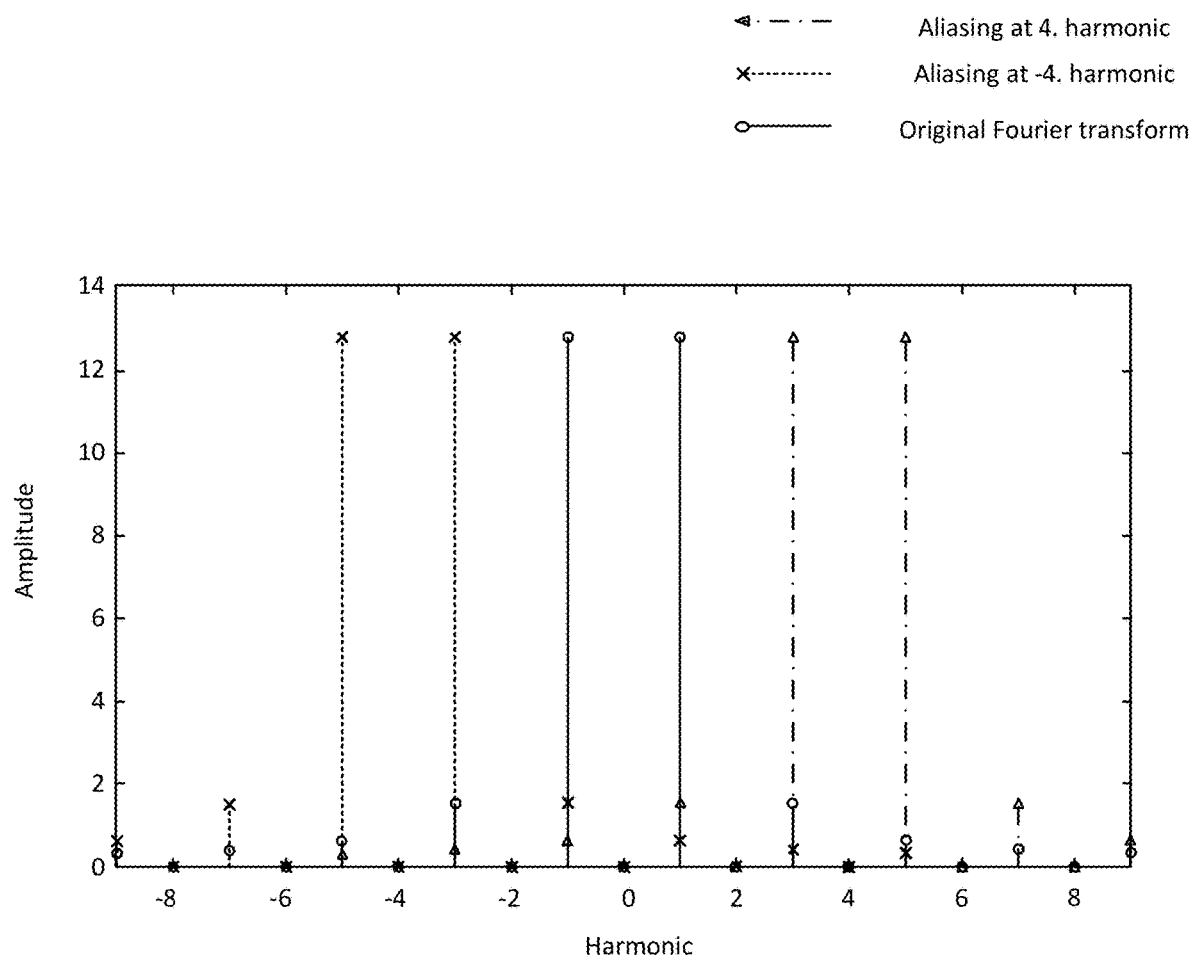
FIG. 6 illustrates aliasing in quad-based sampling.

FIG. 6 illustrates aliasing in quad-based sampling. Due to the quad-based sampling, the DFT obtained from sampling the correlation function with four components repeats at every fourth harmonics. The first harmonic is a sum from several harmonics, here $1^{th}$ harmonic, $-3^{th}$ harmonic, $5^{th}$ harmonic, $-7^{th}$ harmonic, $9^{th}$ harmonic, etc. The circles and solid lines in FIG. 6 represent the original Fourier transform. The crosses and dotted lines in FIG. 6 represent the aliasing at the −4th harmonic. The triangles and dash-dotted lines in FIG. 6 represent the aliasing at the +4th harmonic.

Figure 7:
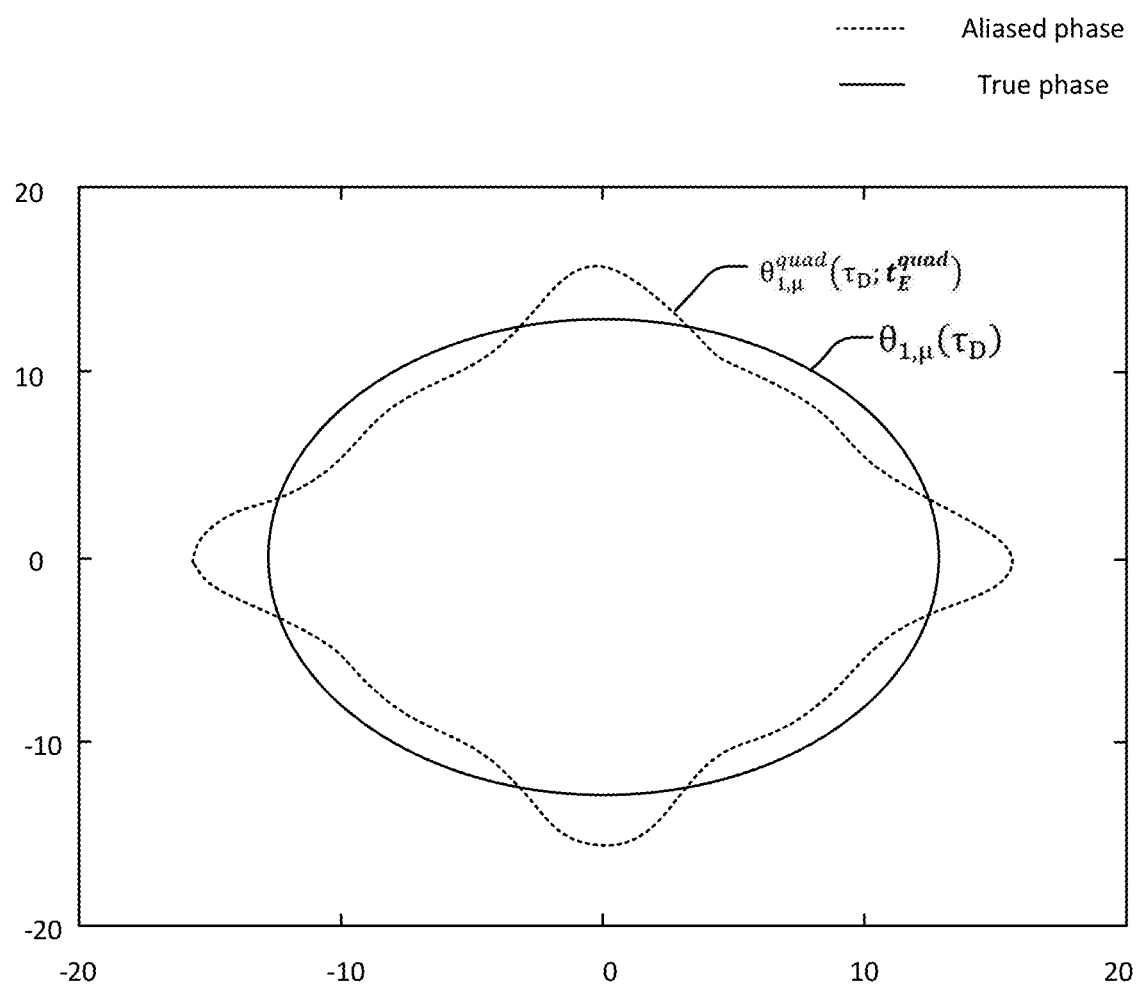
FIG. 7 illustrates, in the IQ space, the estimated IQ measurement $H_{1,\mu}(\tau_D)$ for the true phase (which is approximated by the phase $H_{1,\mu}^{cal}(\tau_D;t_E)$ obtained during calibration) and the aliased IQ measurement $H_{1,\mu}^{quad}(\tau_D;t_E)$ obtained during quad-based sampling.

FIG. 7 illustrates, in the IQ space, the estimated IQ measurement $H_{1,\mu}(\tau_D)$ for the true phase (which is approximated by the phase $H_{1,\mu}^{quad}(\tau_D;t_E^{quad})$ obtained during calibration) and the aliased IQ measurement $H_{1,\mu}(\tau_D;t_E^{quad})$ obtained during quad-based sampling. I and Q represent the real and the imaginary part of the first harmonic.

Figure 8:
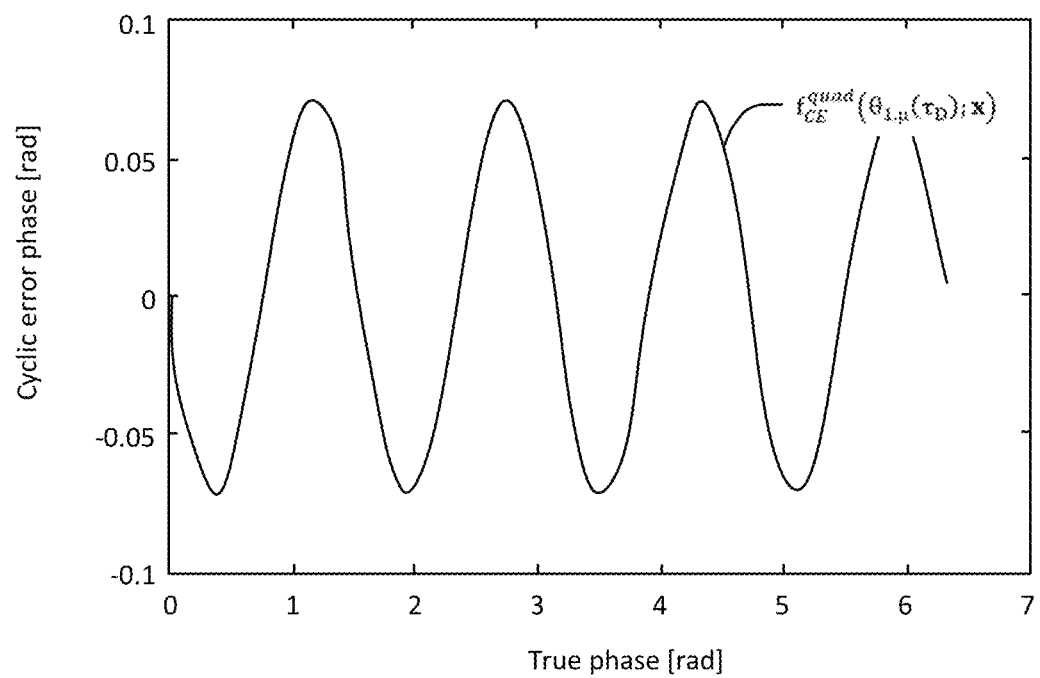
FIG. 8 illustrates, in the phase space, the cyclic error estimate based on first order aliasing.

The IQ measurements $H_{1,\mu}(\tau_D)$ for the true phase has a shape of an ideal ellipse in the IQ-space, whereas the aliased IQ measurements $H_{1,\mu}^{quad}(\tau_D;t_E^{quad})$ comprise a cyclic error contribution $f_{CE}^{quad}(\theta_{1,\mu}(\tau_D);x)$ which results in wiggling of $H_{1,\mu}^{quad}(\tau_D;t_E^{quad})$ over the true phase $H_{1,\mu}(\tau_D)$. FIG. 8 illustrates, in the phase space, the cyclic error estimate based on first order aliasing. The abscissa represents the true phase $\theta_{1,\mu}(\tau_D)$ (which e.g. depends on time-of-flight) and the ordinate represents the quad-based cyclic error $f_{CE}^{quad}(\theta_{1,\mu}(\tau_D);x)$ related to the respective true phase $\theta_{1,\mu}(\tau_D)$.

Figure 9:
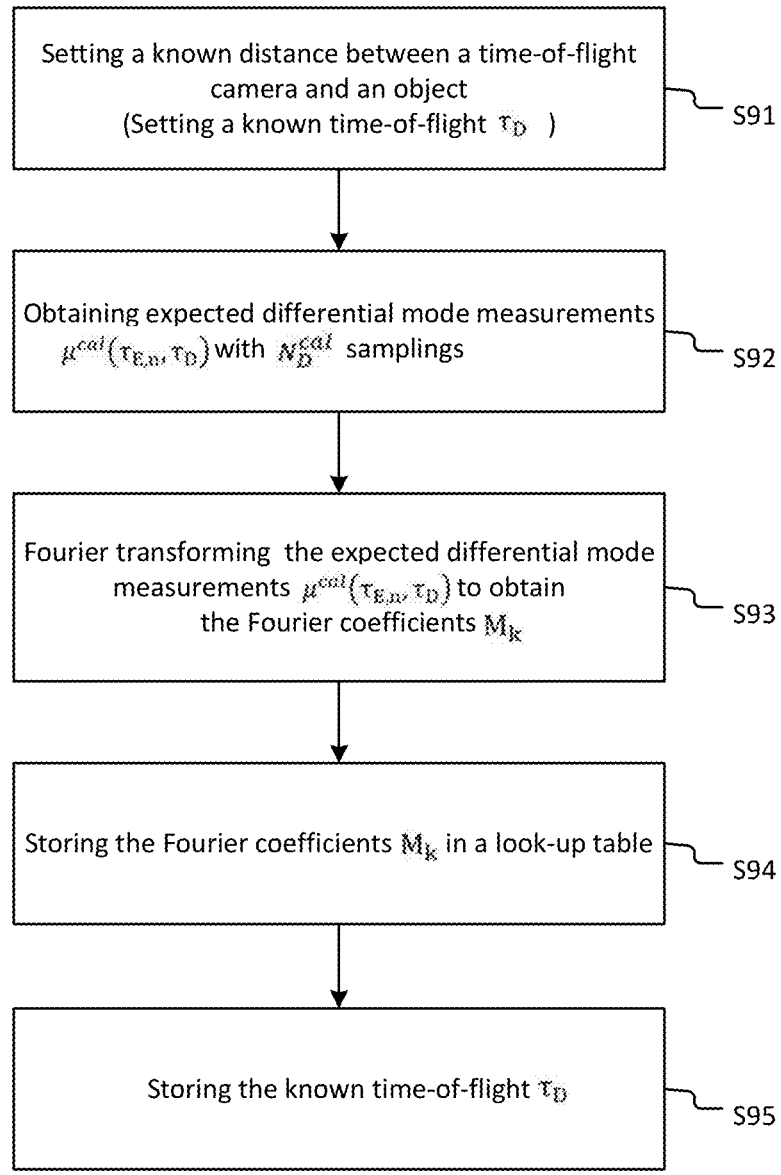
FIG. 9 illustrates, a flow diagram of a process to obtain Fourier coefficients $M_k$ based on a known time-of-flight $\tau_D$, and store the Fourier coefficients $M_k$ and the known time-of-flight $\tau_D$.

FIG. 9 illustrates, a flow diagram of a process to obtain Fourier coefficients $M_k$ based on a known time-of-flight $\tau_D$, and store the Fourier coefficients $M_k$ and the known time-of-flight $\tau_D$.

At S91, Setting a known distance between a time-of-flight camera and an object, hence the time-of-flight $\tau_D$ is known.

At S92, expected differential mode measurements $\mu^{cal}(n\Delta\tau_E,\tau_D)$ of the calibration with $N_D^{cal}$ samplings are obtained.

At S93, the expected differential mode measurements $\mu^{cal}(n\Delta\tau_E,\tau_D)$ is Fourier transformed to obtain the Fourier coefficients $M_k$ (see Eq. 17).

At S94, the Fourier coefficients $M_k$ are stored in a look-up table.

At S95, the known time-of-flight $\tau_D$ is stored.

Figure 10:
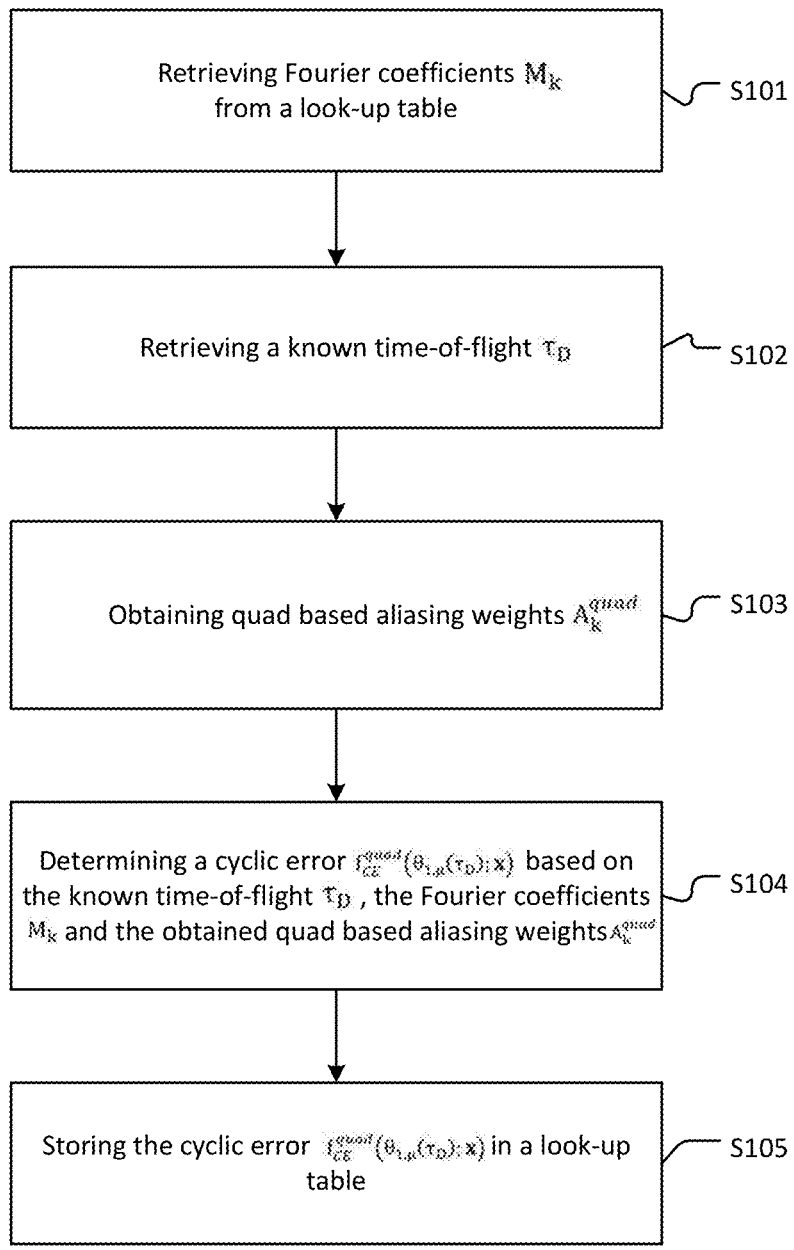
FIG. 10 illustrates, a flow diagram of a process of determining a cyclic error $f_{CE}^{quad}(\theta_{1,\mu}(\tau_D);x)$ based on a known time-of-flight $\tau_D$, Fourier coefficients $M_k$ and quad based aliasing weights $A_k^{quad}$, and storing a cyclic error $f_{CE}^{quad}(\theta_{1,\mu}(\tau_D);x)$ in a look-up table.

FIG. 10 illustrates, a flow diagram of a process of determining a cyclic error $f_{CE}^{quad}(\theta_{1,\mu}(\tau_D);x)$ based on a known time-of-flight $\tau_D$, Fourier coefficients $M_k$ and quad based aliasing weights $A_k^{quad}$, and storing a cyclic error $f_{CE}^{quad}(\theta_{1,\mu}(\tau_D);x)$ in a look-up table.

At S101, Fourier coefficients $M_k$ from a look-up table are retrieved.

At S102, a known time-of-flight $\tau_D$ is retrieved.

At S103, quad based aliasing weights $A_k^{quad}$ are obtained.

At S104, a cyclic error $f_{CE}^{quad}(\theta_{1,\mu}(\tau_D);x)$ is determined based on the known time-of-flight $\tau_D$, the Fourier coefficients $M_k$ and the obtained quad based aliasing weights $A_k^{quad}$. At S105, the cyclic error $f_{CE}^{quad}(\theta_{1,\mu}(\tau_D);x)$ is stored in a look-up table.

Figure 11:
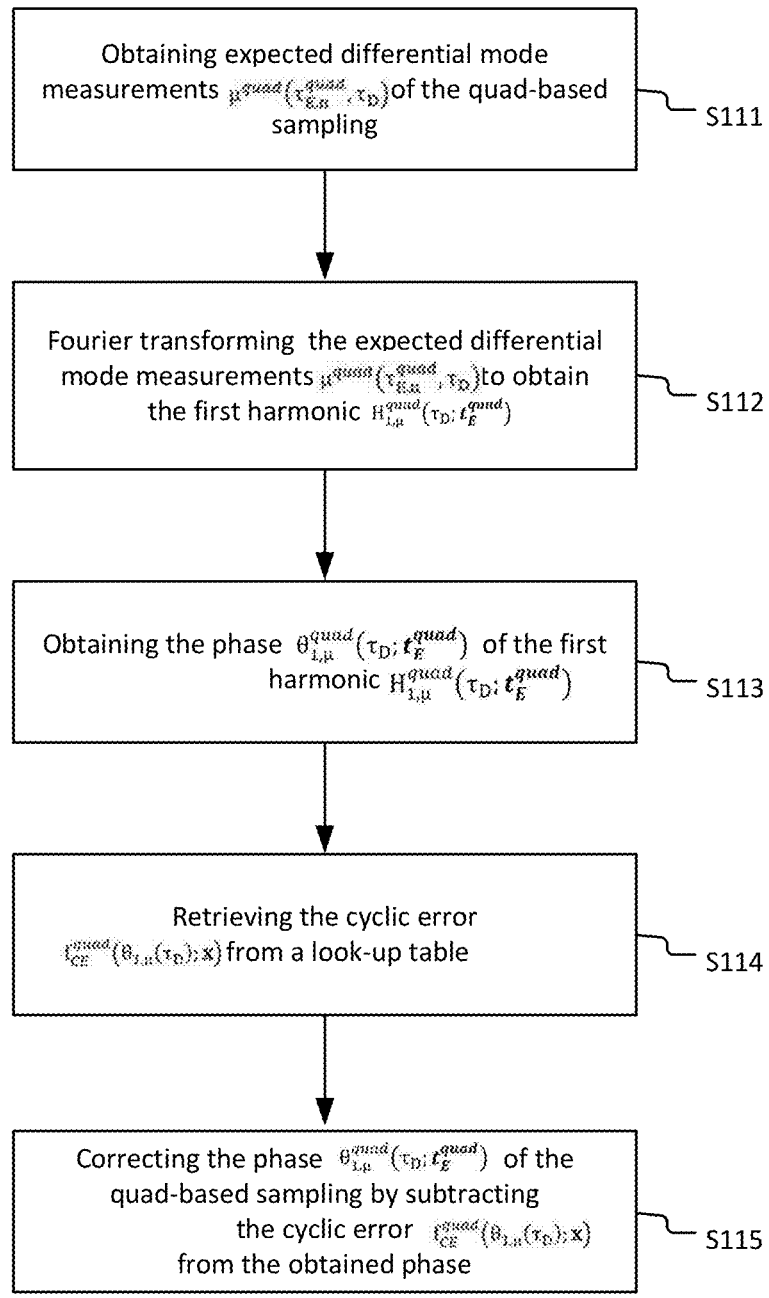
FIG. 11 illustrates, a flow diagram of a process of correcting the phase $\theta_{1,\mu}^{quad}(\tau_D;t_E^{quad})$ of the quad-based sampling based on a cyclic error $f_{CE}^{quad}(\theta_{1,\mu}(\tau_D);x)$ stored in a look-up table.

FIG. 11 illustrates, a flow diagram of a process of correcting the phase $\theta_{1,\mu}^{quad}(\tau_D;t_E^{quad})$ of the quad-based sampling based on a cyclic error $f_{CE}^{quad}(\theta_{1,\mu}(\tau_D);x)$ stored in a look-up table.

At S111, expected differential mode measurements $\mu^{quad}(\tau_{E,n}^{quad},\tau_D)$ of the quad-based sampling are obtained.

At S112, the expected differential mode measurements $\mu^{quad}(\tau_{E,n}^{quad},\tau_D)$ are Fourier transformed to obtain the first harmonic $H_{1,\mu}^{quad}(\tau_D;t_E^{quad})$.

At S113, the phase $\theta_{1,\mu}^{quad}(\tau_D;t_E^{quad})$ of the first harmonic $H_{1,\mu}^{quad}(\tau_D;t_E^{quad})$ of the quad-based sampling is obtained.

At S114, the cyclic error $f_{CE}^{quad}(\theta_{1,\mu}(\tau_D);x)$ stored in a look-up table is retrieved.

At S115, the phase $\theta_{1,\mu}^{quad}(\tau_D;t_E^{quad})$ of the quad-based sampling is corrected by subtracting the cyclic error $f_{CE}^{quad}(\theta_{1,\mu}(\tau_D);x)$ from the obtained phase.

Figure 12:
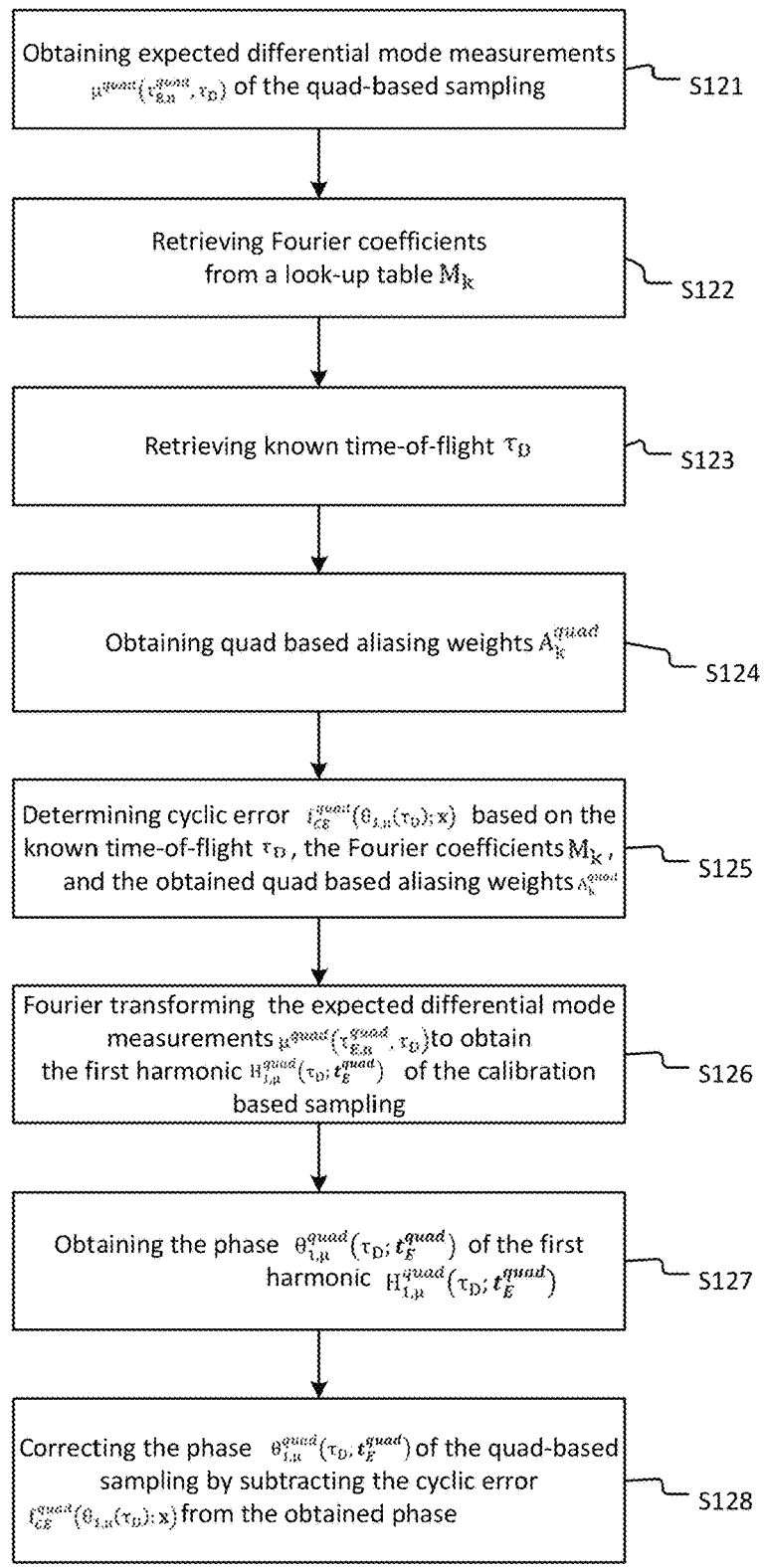
FIG. 12 illustrates, a flow diagram of a process of correcting the phase $\theta_{1,\mu}^{quad}(\tau_D;t_E^{quad})$ of the quad-based sampling based on Fourier coefficients $M_k$ stored in a look-up table.

FIG. 12 illustrates, a flow diagram of a process of correcting the phase $\theta_{1,\mu}^{quad}(\tau_D;t_E^{quad})$ of the quad-based sampling based on Fourier coefficients $M_k$ stored in a look-up table.

At S121, expected differential mode measurements $\mu^{quad}(\tau_{E,n}^{quad},\tau_D)$ of the quad-based sampling are obtained.

At S122, Fourier coefficients $M_k$ from a look-up table are retrieved.

At S123, a known time-of-flight $\tau_D$ is retrieved.

At S124, quad based aliasing weights $A_k^{quad}$ are obtained.

At S125, a cyclic error $f_{CE}^{quad}(\theta_{1,\mu}(\tau_D);x)$ is determined based on the known time-of-flight $\tau_D$, the Fourier coefficients $M_k$ and the obtained quad based aliasing weights $A_k^{quad}$.

At S126, the expected differential mode measurements $\mu^{quad}(\tau_{E,n}^{quad},\tau_D)$ are Fourier transformed to obtain the first harmonic $H_{1,\mu}^{quad}(\tau_D;t_E^{quad})$.

At S127, the phase $\theta_{1,\mu}^{quad}(\tau_D;t_E^{quad})$ of the first harmonic $H_{1,\mu}^{quad}(\tau_D;t_E^{quad})$ of the quad-based sampling is obtained.

At S128, the phase $\theta_{1,\mu}^{quad}(\tau_D;t_E^{quad})$ of the quad-based sampling is corrected by subtracting the cyclic error $f_{CE}^{quad}(\theta_{1,\mu}(\tau_D);x)$ from the obtained phase.

The embodiment of FIGS. 4, 5 and 6 illustrate an embodiment relating to quad-based sampling of a correlation function using the components [0°, 90°, 180°, 270°]. However, other samplings can be applied to construct the measured first harmonic, e.g. [0°, 90°, 120°, 210°], or [0°, 120°, 240°], five components or more.

It should be recognized that the embodiments describe methods with an exemplary ordering of method steps. The specific ordering of method steps is however given for illustrative purposes only and should not be construed as binding.

The flow diagrams in FIG. 9 and FIG. 10 can also be implemented as a computer program causing a computer and/or a processor. In some embodiments, also a non-transitory computer-readable recording medium is provided that stores therein a computer program product, which, when executed by a processor, such as the processor described above, causes the flow diagram described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

[1]. An electronic device comprising circuitry configured to
sample, in a calibration phase using a known time-of-flight $(\tau_D)$, a first set of differential mode measurements $(\mu^{cal}(n\Delta\tau_E,\tau_D))$ according to a first sampling strategy $(t_E^{cal})$,
determine Fourier coefficients $(M_k)$ of the first set of differential mode measurements $(\mu^{cal}(\tau_{E,n},\tau_D))$ based on the known time-of-flight $(\tau_D)$ used in the calibration phase, and to
determine a cyclic error $(f_{CE}(\theta_{1,\mu}(\tau_D);x))$ based on the Fourier coefficients $(M_k)$.

[2]. The electronic device of [1], wherein the circuitry is configured to determine the Fourier coefficients $(M_k)$ in dependence of the number $(N_D^{cal})$ of samples used according to the first sampling strategy $(t_E^{cal})$.

[3]. The electronic device of [1] or [2], wherein the circuitry is further configured to store the Fourier coefficients $(M_k)$ in a look-up table.

[4]. The electronic device of anyone of [1] to [3], wherein according to the first sampling strategy $(t_E^{cal})$, a set (D) of equidistant samples $(\mu(n\Delta\tau_E,\tau_D))$ is measured.

[5]. The electronic device of anyone of [1] to [4], wherein the circuitry is configured to determine aliasing weights $(A_k^{quad})$ based on a second sampling strategy $(t_E^{quad})$.

[6]. The electronic device of [5], wherein the number of components $(N_D^{cal})$ sampled according to the first sampling strategy ($t_E^{cal}$) is larger than the number of components (S) sampled according to the second sampling strategy ($t_E^{quad}$).

[7]. The electronic device of anyone of [1] to [6], wherein the circuitry is configured to determine the Fourier coefficients ($M_k$) according to $$M_k \approx e^{j2\pi k f_M \tau_D} \sum_{n=0}^{N_D^{cal}-1} \mu^{cal}(n\Delta\tau_E, \tau_D) e^{-j2\pi \frac{kn}{N_D^{cal}}}$$

with $N_D^{cal}$ being the number of samples used according to the first sampling strategy ($t_E^{cal}$), $\mu^{cal}(n\Delta\tau_E,\tau_D)$ being the differential mode measurements of the first set of differential mode measurements, k indicating the Harmonics, $f_M$ is a modulation frequency, and $\tau_D$ being the known time-of-flight used in the calibration phase.

[8]. The electronic device of anyone of [1] to [7], wherein the circuitry is configured to determine, for each Fourier coefficient ($M_k$), an aliasing weight ($A_k^{quad}$) according to $$A_k = \sum_{n=0}^{S-1} e^{j2\pi(kf_M\tau_{E,n}-\frac{n}{s})}$$

where $f_M$ is a modulation frequency, S is the number of samples used in the second sampling strategy, and $\tau_{E,n}$ are the transmit delays of the second sampling strategy.

[9]. The electronic device of anyone of [5] to [8], wherein the circuitry is configured to determine the cyclic error ($f_{CE}(\theta_{1,\mu}(\tau_D);x)$) based on the Fourier coefficients ($M_k$), the aliasing weights ($A_k^{quad}$) and the known time-of-flight ($\tau_D$).

[10]. The electronic device of anyone of [1] to [9], wherein the circuitry is configured to determine the cyclic error ($f_{CE}(\theta_{1,\mu}(\tau_D);x)$) in dependence of a phase angle ($\theta_{1,\mu}(\tau_D)$) related to the first Fourier coefficient ($M_1$) of the Fourier coefficients ($M_k$).

[11]. The electronic device of [10], wherein the phase angle $\theta_{1,\mu}(\tau_D)$ is determined according to $$\theta_{1,\mu}(\tau_D) = 2\pi f_M \tau_D + \angle M_1$$

where $M_1$ is the first Fourier coefficient, $f_M$ is the modulation frequency and $\tau_D$ is the single and known time-of-flight.

[12]. The electronic device of anyone of [1] to [11], wherein the circuitry is further configured to store the cyclic error ($f_{CE}^{quad}(\theta_{1,\mu}(\tau_D);x)$) in a look-up table.

[13]. The electronic device of anyone of [1] to [12], wherein the circuitry is configured to use the cyclic error ($f_{CE}(\theta_{1,\mu}(\tau_D);x)$) at runtime to correct a second set of differential mode measurements ($\mu^{quad}(\tau_{E,n}^{quad},\tau_D)$) sampled according to the second sampling strategy.

[14]. The electronic device of anyone of [1] to [13], wherein the circuitry is further configured to retrieve at runtime the cyclic error ($f_{CE}^{quad}(\theta_{1,\mu}(\tau_D);x)$) from a look-up table.

[15]. The electronic device of anyone of [1] to [14], wherein the circuitry is further configured to retrieve at runtime the Fourier coefficients ($M_k$) from a look-up table and to determine the cyclic error ($f_{CE}^{quad}(\theta_{1,\mu}(\tau_D);x)$) based on the Fourier coefficients ($M_k$).

[16]. The electronic device of anyone of [1] to [15], wherein the second sampling strategy ($t_E^{quad}$) is a quad-based sampling strategy.

[17]. A time-of-flight camera (3) comprising the electronic device of anyone of [1] to [16].

[18]. An electronic device comprising circuitry configured to determine, at runtime, a cyclic error ($f_{CE}^{quad}(\theta_{1,\mu}(\tau_D);x)$) based on Fourier coefficients ($M_k$), aliasing weights ($A_k^{quad}$), and a known time-of-flight ($\tau_D$).

[19]. The electronic device of [18], wherein the known time-of-flight ($\tau_D$) has been used in a calibration phase to obtain the Fourier coefficients ($M_k$) according to a first sampling strategy ($t_E^{cal}$).

[20]. The electronic device of [18] or [19], wherein the circuitry is configured to retrieve, at runtime, the Fourier coefficients ($M_k$) from a look-up table.

[21]. The electronic device of anyone of [18] to [20], wherein the circuitry is configured to determine the cyclic error ($f_{CE}(\theta_{1,\mu}(\tau_D);x)$) based on a phase angle ($\theta_{1,\mu}(\tau_D)$) that is related to the first Fourier coefficient ($M_1$) of the Fourier coefficients ($M_k$).

[22]. The electronic device of anyone of [18] to [21], wherein the circuitry is configured to determine the aliasing weights ($A_k^{quad}$) based on a quad-based sampling strategy ($t_E^{quad}$).

[23]. A time-of-flight camera (3) comprising the electronic device of anyone of [18] to [22].

[24]. A method comprising
sampling, in a calibration phase using a known time-of-flight ($\tau_D$), a first set of differential mode measurements ($\mu^{cal}(n\Delta\tau_E,\tau_D)$) according to a first sampling strategy ($t_E^{cal}$),
determining Fourier coefficients ($M_k$) of the first set of differential mode measurements ($\mu^{cal}(\tau_{E,n},\tau_D)$) based on the known time-of-flight ($\tau_D$) used in the calibration phase, and
determining a cyclic error ($f_{CE}(\theta_{1,\mu}(\tau_D);x)$) based on the Fourier coefficients ($M_k$).

[25]. The method of [24], further comprising determining the Fourier coefficients ($M_k$) in dependence of the number ($N_D^{cal}$) of samples used according to the first sampling strategy

[26]. The method of [24] or [25], further comprising storing the Fourier coefficients ($M_k$) in a look-up table.

[27]. The method of anyone of [24] to [26], wherein according to the first sampling strategy ($t_E^{cal}$), a set (D) of equidistant samples ($\mu(n\Delta\tau_E,\tau_D)$) is measured.

[28]. The method of anyone of [24] to [27], further comprising determining aliasing weights ($A_k^{quad}$) based on a second sampling strategy ($t_E^{quad}$).

[29]. The method of [28], wherein the number of components ($N_D^{cal}$) sampled according to the first sampling strategy ($t_E^{cal}$) is larger than the number of components (S) sampled according to the second sampling strategy ($t_E^{quad}$).

[30]. The method of anyone of [24] to [29], further comprising determining the Fourier coefficients ($M_k$) according to $$M_k \approx e^{j2\pi k f_M \tau_D} \sum_{n=0}^{N_D^{cal}-1} \mu^{cal}(n\Delta\tau_E, \tau_D) e^{-j2\pi \frac{kn}{N_D^{cal}}}$$

with $N_D^{cal}$ being the number of samples used according to the first sampling strategy ($t_E^{cal}$), $\mu_{cal}(n\Delta\tau_E,\tau_D)$ being the differential mode measurements of the first set of differential mode measurements, k indicating the Harmonics, $f_M$ is a modulation frequency, and $\tau_D$ being the known time-of-flight used in the calibration phase.

[31]. The method of anyone of [24] to [30], wherein the circuitry is configured to determine, for each Fourier coefficient ($M_k$), an aliasing weight ($A_k^{quad}$) according to $$A_k = \sum_{n=0}^{S-1} e^{j2\pi(kf_M\tau_{E,n}-\frac{n}{s})}$$

where $f_M$ is a modulation frequency, S is the number of samples used in the second sampling strategy, and $\tau_{E,n}$ are the transmit delays of the second sampling strategy.

[32]. The method of anyone of [29] to [31], further comprising determining the cyclic error ($f_{CE}(\theta_{1,\mu}(\tau_D);x)$) based on the Fourier coefficients ($M_k$), the aliasing weights ($A_k^{quad}$) and the known time-of-flight ($\tau_D$).

[33]. The method of anyone of [24] to [32], further comprising determining the cyclic error ($f_{CE}(\theta_{1,\mu}(\tau_D);x)$) in dependence of a phase angle ($\theta_{1,\mu}(\tau_D)$) related to the first Fourier coefficient ($M_1$) of the Fourier coefficients ($M_k$).

[34]. The method of [23], wherein the phase angle $\theta1,\mu(\tau_D)$ is determined according to $$\theta_{1,\mu}(\tau_D) = 2\pi f_M \tau_D + \angle M_1$$

where $M_1$ is the first Fourier coefficient, $f_M$ is the modulation frequency and $\tau_D$ is the single and known time-of-flight.

[35]. The method of anyone of [24] to [34], further comprising storing the cyclic error ($f_{CE}(\theta_{1,\mu}(\tau_D);x)$) in a look-up table.

[36]. The method of anyone of [24] to [35], further comprising using the cyclic error ($f_{CE}(\theta_{1,\mu}(\tau_D);x)$) at runtime to correct a second set of differential mode measurements ($\mu^{quad}(\tau_{E,n}^{quad},\tau_D)$) sampled according to the second sampling strategy.

[37]. The method of anyone of [24] to [36], further comprising retrieving at runtime the cyclic error ($f_{CE}^{quad}(\theta_{1,\mu}(\tau_D);x)$) from a look-up table.

[38]. The method of anyone of [24] to [37], further comprising retrieving at runtime the Fourier coefficients ($M_k$) from a look-up table and to determine the cyclic error ($f_{CE}^{quad}(\theta_{1,\mu}(\tau_D);x)$) based on the Fourier coefficients ($M_k$).

[39]. The method of anyone of [28] to [39], wherein the second sampling strategy (t d) is a quad-based sampling strategy.

[40]. A method comprising determining, at runtime, a cyclic error ($f_{CE}^{quad}(\theta_{1,\mu}(\tau_D);x)$) based on Fourier coefficients ($M_k$), aliasing weights ($A_k^{quad}$), and a known time-of-flight ($\tau_D$).

[41]. The method of [40], wherein the known time-of-flight ($\tau_D$) has been used in a calibration phase to obtain the Fourier coefficients ($M_k$) according to a first sampling strategy ($t_E^{cal}$).

[42]. The method of [40] or [41], further comprising retrieving, at runtime, the Fourier coefficients ($M_k$) from a look-up table.

[43]. The method of anyone of [40] to [42], further comprising determining the cyclic error ($f_{CE}(\theta_{1,\mu}(\tau_D);x)$) based on a phase angle ($\theta_{1,\mu}(\tau_D)$) that is related to the first Fourier coefficient ($M_1$) of the Fourier coefficients ($M_k$).

[44]. The method of anyone of [40] to [43], further comprising determining the aliasing weights ($A_k^{quad}$) based on a quad-based sampling strategy ($t_E^{quad}$).

[45]. A computer program comprising instructions which when executed on a processor cause the processor to implement the method of anyone of [24] to [44].

[46]. A machine-readable storage medium comprising instructions which when executed on a processor cause the processor to implement the method of anyone of [24] to [44].

The invention claimed is:

1. An electronic device comprising:
   circuitry configured to:
   sample, in a calibration phase using a known time-of-flight, a first set of differential mode measurements according to a first sampling strategy,
   determine Fourier coefficients of the first set of differential mode measurements based on the known time-of-flight used in the calibration phase,
   determine a cyclic error based on the Fourier coefficients, and
   perform a runtime calibration of image data obtained by a time-of-flight camera to remove the cyclic error, the image data having an unknown time-of-flight,
   wherein the circuitry is configured to determine the Fourier coefficients according to $$M_k \approx e^{j2\pi k f_M \tau_D} \sum_{n=0}^{N_D^{cal}-1} \mu^{cal}(n\Delta\tau_E, \tau_D) e^{-j2\pi \frac{kn}{N_D^{cal}}}$$

with $N_D^{cal}$ being a number of samples used according to the first sampling strategy, $\mu^{cal}(n\Delta\tau_E,\tau_D)$ being differential mode measurements of the first set of differential mode measurements, k indicating harmonics, $f_M$ being a modulation frequency, and $\tau_D$ being the known time-of-flight used in the calibration phase.

2. The electronic device of claim 1, wherein the circuitry is configured to determine the Fourier coefficients in dependence of the number of samples used according to the first sampling strategy.

3. The electronic device of claim 1, wherein the circuitry is further configured to store the Fourier coefficients in a look-up table.

4. The electronic device of claim 1, wherein according to the first sampling strategy, a set of equidistant samples is measured.

5. The electronic device of claim 1, wherein the circuitry is configured to determine aliasing weights, which compensate for at least one of phase offset and phase shift, based on a second sampling strategy.

6. The electronic device of claim 5, wherein the number samples used according to the first sampling strategy is larger than a number of samples used according to the second sampling strategy.

7. The electronic device of claim 6, wherein the circuitry is configured to determine, for each Fourier coefficient, an aliasing weight according to $$A_k = \sum_{n=0}^{S-1} e^{j2\pi(kf_M\tau_{E,n} - \frac{n}{S})}$$

where $f_M$ is a modulation frequency, S is the number of samples used according to the second sampling strategy, and $\tau_{E,n}$ are transmit delays of the second sampling strategy.

8. The electronic device of claim 5, wherein the circuitry is configured to determine the cyclic error based on the Fourier coefficients, the aliasing weights, which compensate for at least one of phase offset and phase shift, and the known time-of-flight.

9. The electronic device of claim 5, wherein the circuitry is configured to use the cyclic error at runtime to correct a second set of differential mode measurements sampled according to the second sampling strategy.

10. The electronic device of claim 5, wherein the second sampling strategy is a quad-based sampling strategy.

11. The electronic device of claim 1, wherein the circuitry is configured to determine the cyclic error in dependence of a phase angle related to a first Fourier coefficient of the Fourier coefficients.

12. The electronic device of claim 11, wherein the phase angle is determined according to $$\theta_{1,\mu}(\tau_D) = 2\pi f_M \tau_D + \angle M_1$$

where $\theta_{1,\mu}(\tau_D)$ is the phase angle, $M_1$ is the first Fourier coefficient, $f_M$ is the modulation frequency, and $T_D$ is a single time-of-flight and is the known time-of-flight.

13. The electronic device of claim 1, wherein the circuitry is further configured to store the cyclic error in a look-up table.

14. The electronic device of claim 1, wherein the circuitry is further configured to retrieve at runtime the cyclic error from a look-up table.

15. The electronic device of claim 1, wherein the circuitry is further configured to retrieve at runtime the Fourier coefficients from a look-up table and to determine the cyclic error based on the Fourier coefficients.

16. A time-of-flight camera comprising the electronic device of claim 1.

17. An electronic device comprising:
circuitry configured to:
determine, at runtime, a cyclic error based on Fourier coefficients, aliasing weights, which compensate for at least one of phase offset and phase shift, and a known time-of-flight used in a calibration phase, and
perform a runtime calibration of image data obtained by a time-of-flight camera to remove the cyclic error, the image data having an unknown time-of-flight, wherein the circuitry is configured to determine the Fourier coefficients according to $$M_k \approx e^{j2\pi k f_M \tau_D} \sum_{n=0}^{N_D^{cal}-1} \mu^{cal}(n\Delta\tau_E, \tau_D) e^{-j2\pi \frac{kn}{N_D^{cal}}}$$

with $N_D^{cal}$ being a number of samples used according to a first sampling strategy, $\mu^{cal}(n\Delta\tau_E, \tau_D)$ being differential mode measurements of a first set of differential mode measurements, k indicating harmonics, $f_M$ being a modulation frequency, and $\tau_D$ being the known time-of-flight used in the calibration phase.

18. The electronic device of claim 17, wherein the known time-of-flight is used in the calibration phase to obtain the Fourier coefficients according to the first sampling strategy.

19. The electronic device of claim 17, wherein the circuitry is configured to retrieve, at runtime, the Fourier coefficients from a look-up table.

20. The electronic device of claim 17, wherein the circuitry is configured to determine the cyclic error based on a phase angle related to a first Fourier coefficient of the Fourier coefficients.

21. The electronic device of claim 17, wherein the circuitry is configured to determine the aliasing weights based on a quad-based sampling strategy.

22. A time-of-flight camera comprising the electronic device of claim 17.

* * * * *